United States Patent
Abramson

[19]

[11] Patent Number: 6,151,313
[45] Date of Patent: Nov. 21, 2000

[54] BASEBAND PHASE ESTIMATION TECHNIQUE FOR DEMODULATION OF OVERLAPPING PACKETS

[75] Inventor: Norman Abramson, San Francisco, Calif.

[73] Assignee: Aloha Networks, Inc., San Francisco, Calif.

[21] Appl. No.: 08/870,298

[22] Filed: Jun. 6, 1997

[51] Int. Cl.⁷ .................................................. H04B 7/216
[52] U.S. Cl. ............................................................ 370/342
[58] Field of Search ................................... 370/206, 320, 370/335, 342; 375/207, 342, 130, 135, 219, 215

[56] References Cited

U.S. PATENT DOCUMENTS

| | | |
|---|---|---|
| Re. 32,905 | 4/1989 | Baran . |
| 4,071,706 | 1/1978 | Warren ............................... 179/15 AL |
| 4,455,651 | 6/1984 | Baran . |
| 4,545,061 | 10/1985 | Hileman . |
| 4,560,984 | 12/1985 | Scholl ................................... 340/825.5 |
| 4,667,334 | 5/1987 | Collec et al. ........................... 375/116 |
| 4,841,527 | 6/1989 | Raychauduri et al. . |
| 5,084,900 | 1/1992 | Taylor . |
| 5,136,612 | 8/1992 | Bi . |
| 5,151,919 | 9/1992 | Dent . |
| 5,218,619 | 6/1993 | Dent . |
| 5,235,612 | 8/1993 | Stilwell et al. . |
| 5,245,612 | 9/1993 | Kachi et al. . |
| 5,305,348 | 4/1994 | Izumi . |
| 5,313,493 | 5/1994 | Dutta ......................................... 375/56 |
| 5,377,225 | 12/1994 | Davis . |
| 5,410,568 | 4/1995 | Schilling . |
| 5,430,760 | 7/1995 | Dent . |
| 5,430,761 | 7/1995 | Bruckert et al. . |
| 5,432,813 | 7/1995 | Barham et al. ........................... 375/207 |
| 5,459,762 | 10/1995 | Wang et al. ............................... 375/336 |
| 5,537,397 | 7/1996 | Abramson . |
| 5,566,165 | 10/1996 | Sawahashi et al. . |
| 5,610,949 | 3/1997 | Petranovich ............................. 375/330 |
| 5,764,646 | 6/1998 | Dent ......................................... 370/479 |
| 5,764,706 | 6/1998 | Carlin et al. ............................. 375/326 |
| 5,784,366 | 7/1998 | Apelewicz ............................... 370/342 |
| 5,848,096 | 12/1998 | Shou et al. ............................... 375/207 |
| 5,872,808 | 2/1999 | Davidovici et al ..................... 375/207 |

OTHER PUBLICATIONS

"Spread Aloha for VSAT's", ALOHA System Technical Report B86–4b University of Hawaii, Honolulu, Jun. 1986.
"CDMA Wireless COmmunications", Commercial brochure dated Apr. 30, 1993 at 3.
Abramson, Norman, "Multiple Access in Wireless Digital Networks", Proceedings of the IEEE, Sep. 1994.

(List continued on next page.)

*Primary Examiner*—Chau Nguyen
*Assistant Examiner*—Chiho Andrew Lee
*Attorney, Agent, or Firm*—James Creighton Wray; Meera P. Narasimhan

[57] ABSTRACT

A SAMA QAM demodulator and packet detector receives SAMA transmissions from multiple transmitters. The received data packets have bits divided into chips in a first spreading sequence in the in phase branches of the transmitters, and a second spreading sequence in the quadrature branches of the transmitters. A demodulator at the hub station has a received signal splitter and an oscillator and phase shifter and multipliers for mixing the incoming signals with the oscillator output and with the phase shifted oscillator output on different branches. Low pass filters are connected to the mixers to remove the carrier signals and to leave chip signals with cosine and sine of phase offsets. The signal from each low pass filter is fed to an in phase matched filter and a quadrature matched filter, four matched filters in total, to produce despread signals from all of the active transmitters with phase relation and start offsets. The signals from the individual matched filters are passed to packet synchronization sequence detectors, which detect the start times of each of the data packets. The start times of the data packets and estimates of the phase angles are used in bit decisions in which substantially concurrent data packets received from remote transmitters are separated.

17 Claims, 2 Drawing Sheets

OTHER PUBLICATIONS

Price, R. & Green, P.E., "Communication Techniique for Multipath Channels", Proceedings of the IRE, pp. 555–570.

Abramson, Norman, "Development of the ALOHANET", IEEE Transactions on Information theory, vol. IT–31, No. 2, Mar. 1985.

Lipke et al., "MARISAT– A Maritime Satellite Communications Systems", COMSAT Technical Review, vol. 7, No.2, pp. 351–391, Fall 1977.

Abramson, Norman, "VSAT Data Networks", Proceedings of the IEEE, Special Issue on Statellite Comm., vol. 78, No.7, pp. 1267–1274, Jul .19.

Kerr, Richard, CDMA Digital Cellular, An ASIC Overview, Applied Microwave & Wireless, pp. 30–41, Fall 1993.

Abramson, Norman, "Fundamentals of Packet Multiple Access . . . ", IEEE Journal on Selected Areas in Communication, vol. 10, No. 2, Feb. 1992.

Scholtz, R. A., "Multiple Access with Time–Hopping Impulse Modulation," Communication Sc. Inst., Univ. of S, CA, Los Angeles, CA.

Abramson, Norman, "A Note on Code Division in CDMA", DBA/Wireless Systems, May 1994.

Ewerbring, et al., "CDMA–IC:A Proposal for Future High Capacity . . . ", Proceedings of the 1993 IEEE Vehicular Technology Conf., pp. 440–443.

Viterbi et al., "Erlang Capacity of a Power Controlled CDMA System", QUALCOMM Incorporated, Feb.11, 1993.

$c(t) = a_I(t)\cos(\omega_0 t + \theta_0) - a_Q(t)\cos(\omega_0 t + \theta_0)$

IS -- In phase spreader    QS - quadrature spreader $c_I(t) = c(t)\cos(\omega_0 t + \theta_0 + \delta)$    $c_Q(t) = -c(t)\sin(\omega_0 t + \theta_0 + \delta)$ $C_I(t) = C(t) \cos(\omega_0 t + \theta_0 + \delta)$   $C_Q(t) = -C(t) \sin(\omega_0 t + \theta_0 + \delta)$

BASEBAND PHASE ESTIMATION TECHNIQUE FOR DEMODULATION OF OVERLAPPING PACKETS

BACKGROUND OF THE INVENTION

The present invention relates to the multiple access sharing of a single communication channel by multiple transmitters of digital information.

Spread ALOHA™ is a new connection-free multiple access technique which is described in detail in U.S. Pat. No. 5,537,397, SPREAD ALOHA CDMA DATA COMMUNICATIONS, by Norman Abramson, issued Jul. 16, 1996. Spread ALOHA Multiple Access (SAMA™) may be viewed as a form of Code Division Multiple Access (CDMA) where each transmitter uses the identical spreading code and signals from various transmitters are separated at the hub receiver using a fundamentally different method than the code division employed in conventional CDMA networks. In a related patent application DUAL CODE MULTIPLE ACCESS FOR WIRELESS DATA NETWORKS, filed in the United States Patent Office on Jun. 19, 1996, Ser. No. 08/665,843, the basic idea of SAMA was extended to include the case where more than a single spreading code is used in the network.

The difference between Dual Code Multiple Access, as described in the above referenced patent application, and CDMA is that in a Dual Code Multiple Access network the different spreading codes are assigned to different classes of channel traffic or to two different branches of the transmitter (in phase and quadrature) in a QAM modulation system. Since the number of different codes required for that purpose can be many times less than the number of different codes required in a CDMA network Spread Aloha multiple access techniques are much easier to implement in networks with large numbers of potential transmitters.

In a Spread ALOHA multiple access network or in a Dual Code Spread ALOHA multiple access network the receiver at the hub station must separate transmissions from several transmitters which are transmitting at the same time. Since transmissions from different transmitters will ordinarily employ the same spreading codes, the hub receiver cannot separate those signals on the basis of the spreading codes as is ordinarily done in a CDMA network.

SUMMARY OF THE INVENTION

The present invention describes an efficient technique for separating data packets from different transmitters in a SAMA network using different spreading codes in the quadrature and the in phase channels of the transmitters. The transmitters in the network may all use only one spreading code in the quadrature channel and one in the in phase channel, or the transmitters in the network may use a small number of pairs of such spreading codes in each of those two channels depending upon the class of the traffic to be transmitted.

In the present invention means are provided for detecting the start times of multiple overlapping packets transmitted in a SAMA. Means are also provided for estimating the carrier phase offset (or the sine and cosine of the carrier phase offset or some fixed constant times the sine and cosine of the carrier phase offset) of packets transmitted in such a channel. Further, means are provided for using the start times and the phase estimates for the detection of bits transmitted in such a channel.

These and further and other objects and features of the invention are apparent in the disclosure, which includes the above and ongoing written specification, along with the claims and the drawings.

DETAILED DESCRIPTION OF THE PREFERRED EMBODIMENTS

In this invention a method is disclosed for separating several signals from different transmitters in a SAMA receiver. When only one signal is received at any one time techniques for the modulation and demodulation of the signal are well known.

Figure 1:
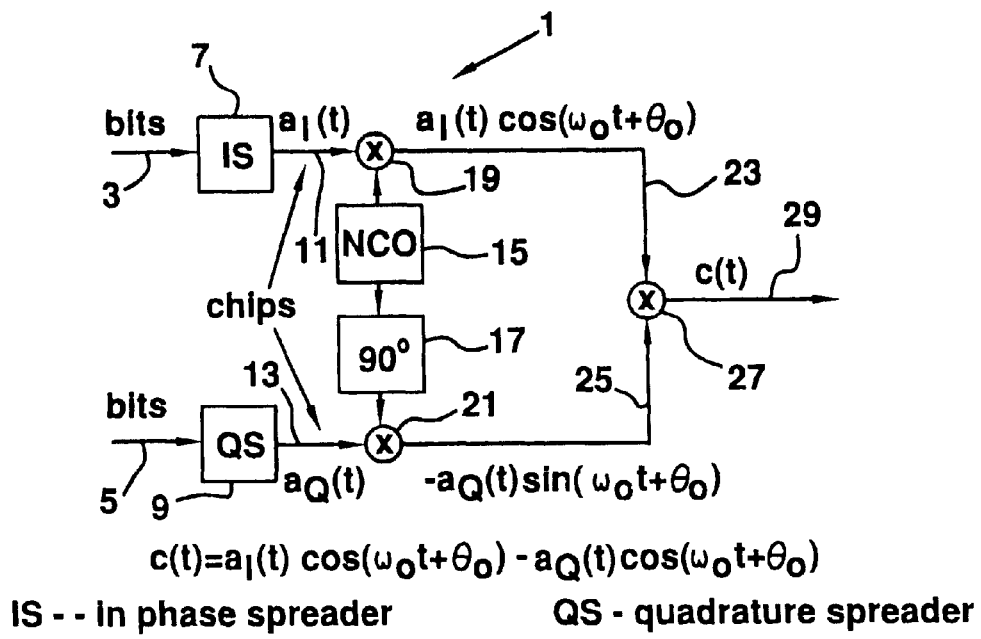
FIG. 1 is a schematic representation of a SAMA QAM modulator.

Assume two direct sequence spread spectrum bandlimited signals, $a_I(t)$ and $a_Q(t)$, are provided. In both CDMA and SAMA those signals consist of a sequence of chips representing bits to be transmitted. QAM modulation of those signals is accomplished by multiplying the signals by the output of a numerically controlled oscillator (NCO) where the quadrature multiplication is shifted 90 degrees in phase. FIG. 1 is a block diagram of a QAM modulator for SAMA™, with IS being the in phase spreader and QS being the quadrature spreader. In the usual situation the in phase and quadrature signals, $a_I(t)$ and $a_Q(t)$, are bandlimited to a frequency much less than the carrier frequency $\omega_0$. The phase shift, $\theta_0$, of the NCO is a random variable and not a function of time.

Figure 2:
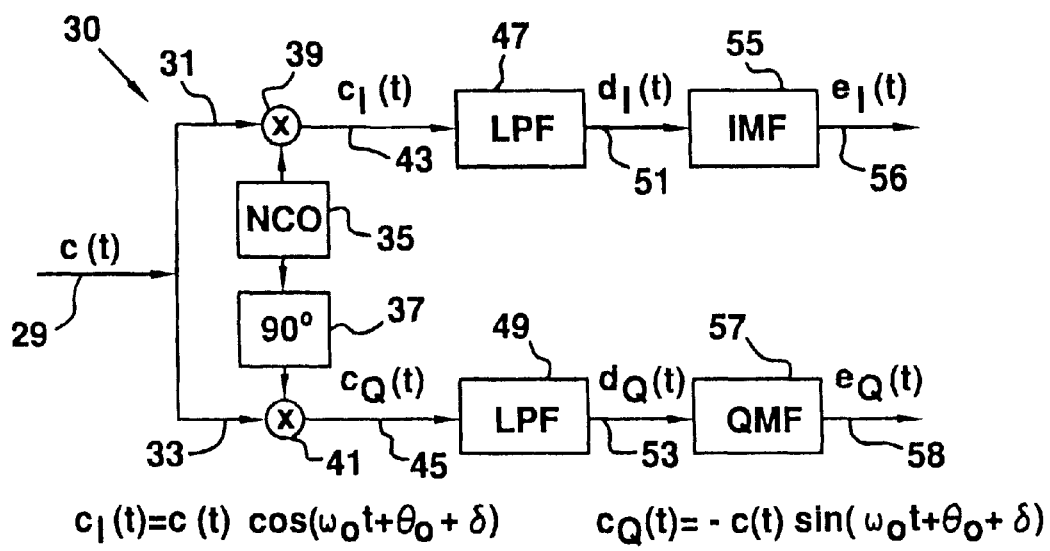
FIG. 2 is a schematic representation of a conventional QAM demodulator.

FIG. 2 shows a conventional demodulator for the signal. The overall structure of the demodulator is similar to that of the modulator. The multiplication of the input by the output of an NCO results in a double frequency component and a baseband component in each channel. The double frequency component is filtered out by Low Pass Filters (LPF) and the outputs, $d_I(t)$ and $d_Q(t)$, can be written as:

$$d_I(t) = \tfrac{1}{2} a_I(t) \cos(\delta) + \tfrac{1}{2} a_Q(t) \sin(\delta) \tag{1}$$

and $$d_Q(t) = -\tfrac{1}{2} a_I(t) \sin(\delta) + \tfrac{1}{2} a_Q(t) \cos(\delta) \tag{2}$$

where $\delta$ is the phase offset between the NCO and the received carrier, c(t). When $\delta=0$, the resulting equations are $d_I(t) = \tfrac{1}{2} a_I(t)$ and $d_Q(t) = \tfrac{1}{2} a_Q(t)$, the original baseband signals.

When the QAM modulator operates on a spread spectrum signal the low pass filter is followed by either a correlator or a matched filter to despread the received signal. FIG. 2 shows the in phase matched filter (IMF) and quadrature matched filter (QMF) form of despreading.

In the case of the SAMA™ channel, however, the received signal is not always in the form of c(t) as defined in FIG. 2, but rather it may consist of C(t), a sum of signals each having the form of c(t) but each with a different carrier phase and a different modulated signal. C(t) may be written as the sum of terms:

$$C(t) = \sum_1^n a_{kI}(t)\cos(\omega_0 t + \theta_k) - \sum_1^n a_{kQ}(t)\sin(\omega_0 t + \theta_k) \quad (3)$$

where the index k specifies a given transmitter, and there are n active transmitters in the interval of interest.

Equations (1) and (2), which provide the received signal after the high order frequency terms have been filtered out for the conventional demodulator, can be rewritten for the case of the multiple access channel with n independent transmitters as $$D_I(t) = \frac{1}{2}\sum_1^n a_{kI}(t)\cos(\delta_k) + \frac{1}{2}\sum_1^n a_{kQ}(t)\sin(\delta_k) \quad (4)$$

and $$D_Q(t) = -\frac{1}{2}\sum_1^n a_{kI}(t)\sin(\delta_k) + \frac{1}{2}\sum_1^n a_{kQ}(t)\cos(\delta_k) \quad (5)$$

where the $\delta_k$ are the phase offsets of the phase of the single NCO relative to the phase of the carrier from the kth transmitter.

Since all of the phase offsets in Equations (4) and (5), $\delta_k$, cannot be set to be equal to zero simultaneously when there are multiple packets in the SAMA channel, one cannot be sure that only the in phase component of the signal will appear at the I branch, and one cannot be sure that only the quadrature component of the signal will appear at the Q branch of FIG. 2. Thus, in the case of a SAMA channel with asynchronous transmitters (that is, multiple RF phase values) the in phase and quadrature components of the signal cannot be separated by a single conventional receiver synchronization process.

Figure 3:
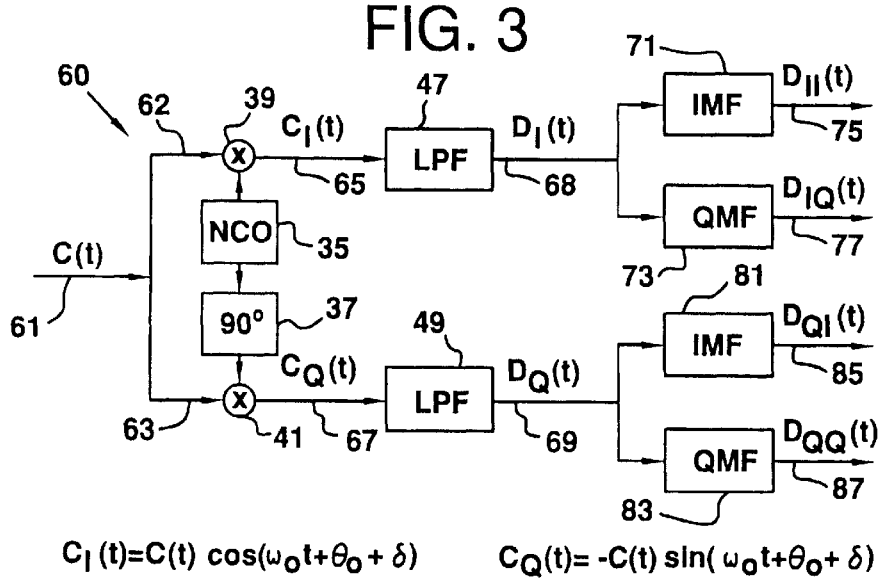
FIG. 3 is a schematic representation of a SAMA QAM demodulator.

The present invention provides an asynchronous multiple access generalization of the conventional QAM demodulator shown in FIG. 2, which is suitable for the demodulation of multiple SAMA packets in a common channel, a SAMA QAM demodulator. In FIG. 3 the receiver of FIG. 2 is expanded to provide two different despreading filters at the output of each channel, an I matched filter (IMF) and a Q matched filter (QMF).

To simplify the analysis, it is assumed that there are only two different active transmitters (k=2). After the problem is solved for the case of k=2, the case for general values of k is obvious. When k=2, equations (4) and (5) become $$D_I(t) = \frac{1}{2}[a_{1I}(t)\cos(\delta_1) + a_{2I}(t)\cos(\delta_2) + a_{1Q}(t)\sin(\delta_1) + a_{2Q}(t)\sin(\delta_2)] \quad (6)$$

and $$D_Q(t) = \frac{1}{2}[-a_{1I}(t)\sin(\delta_1) - a_{2I}(t)\sin(\delta_2) + a_{1Q}(t)\cos(\delta_1) + a_{2Q}(t)\cos((\delta_2)] \quad (7)$$

which define the outputs of the four matched filters as shown in FIG. 3. The results of the despreading matched filters on each of the components of $D_I(t)$ and $D_Q(t)$ are shown in FIG. 4.

Figure 4:
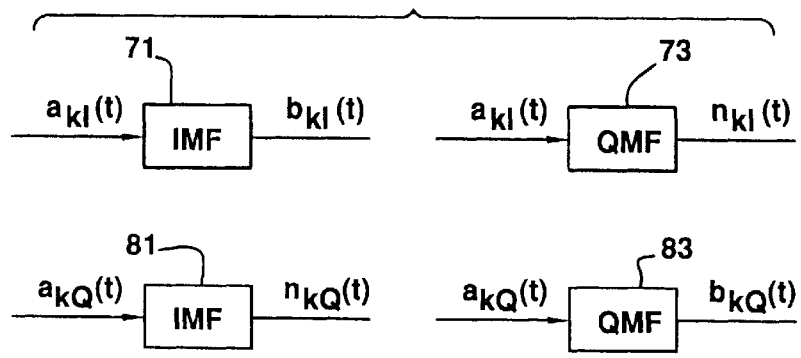
FIG. 4 is a schematic representation of quadrature matched filters.

The notation of FIG. 4 anticipates treating the results of quadrature processing of in phase components, and vice versa, as noise. It is assumed that the spreading gain is high enough so that the in phase despreading of quadrature spread signals and the quadrature despreading of in phase spread signals do not produce significant peaks in the output. Then, ignoring the scale factor of ½, the following is provided:

$$D_{II}(t) = b_{1I}(t)\cos(\delta_1) + b_{2I}(t)\cos(\delta_2) + \quad (8)$$
$$n_{1Q}(t)\sin(\delta_1) + n_{2Q}(t)\sin(\delta_2)$$
$$= b_{1I}(t)\cos(\delta_1) + b_{2I}(t)\cos(\delta_2) + N_{II}(t)$$

$$D_{IQ}(t) = n_{1I}(t)\cos(\delta_1) + n_{2I}(t)\cos(\delta_2) + \quad (9)$$
$$b_{1Q}(t)\sin(\delta_1) + b_{2Q}(t)\sin(\delta_2)$$
$$= b_{1Q}(t)\sin(\delta_1) + b_{2Q}(t)\sin(\delta_2) + N_{1Q}(t)$$

$$D_{QI}(t) = -b_{1I}(t)\sin(\delta_1) - b_{2I}(t)\sin(\delta_2) + \quad (10)$$
$$n_{1Q}(t)\cos(\delta_1) + n_{2Q}(t)\cos(\delta_2)$$
$$= -b_{1I}(t)\sin(\delta_1) - b_{2I}(t)\sin(\delta_2) + N_{QI}(t)$$

$$D_{QQ}(t) = -n_{1I}(t)\sin(\delta_1) - n_{2I}(t)\sin(\delta_2) + \quad (11)$$
$$b_{1Q}(t)\cos(\delta_1) + b_{2Q}(t)\cos(\delta_2)$$
$$= b_{1Q}(t)\cos(\delta_1) + b_{2Q}(t)\cos(\delta_2) + N_{QQ}(t)$$

With the expanded processing shown in FIG. 3, the $N_{II}$, $N_{IQ}$, $N_{QI}$, and $N_{QQ}$ are simply noise equivalent processes out of the despreading filters. Equations (8)–(11) provide sequences of samples with the I samples in $D_{II}$ and $D_{QI}$ and the Q samples in $D_{IQ}$ and $D_{QQ}$.

Separation of the desired b**(t)signals by means of an RF phase tracking loop as would be done in the case of a channel with only one received signal is possible by implementing a new procedure for detecting packets. The present invention includes a packet detection procedure followed by a bit detection procedure.

The new procedure for modulation and demodulation of multiple signals begins with the process of packet detection, and uses the parameters derived from the packet detection process to make decisions on the bits in the packet. The reason for breaking the process apart in that manner is that the packet detection process operates with an output signal to noise ratio considerably higher than the bit detection process.

Equations (8) through (11) are rewritten focusing on a single received signal and, to simplify the discussion, a simplified notation is introduced.

$$D_{II}(t) = b_{1I}(t)\cos(\delta_1) + n_1(t) \quad (12)$$

$$D_{IQ}(t) = b_{1Q}(t)\sin(\delta_1) + n_2(t) \quad (13)$$

$$D_{QI}(t) = -b_{1I}(t)\sin(\delta_1) + n_3(t) \quad (14)$$

$$D_{QQ}(t) = b_{1Q}(t)\cos(\delta_1) + n_4(t) \quad (15)$$

Figure 5:
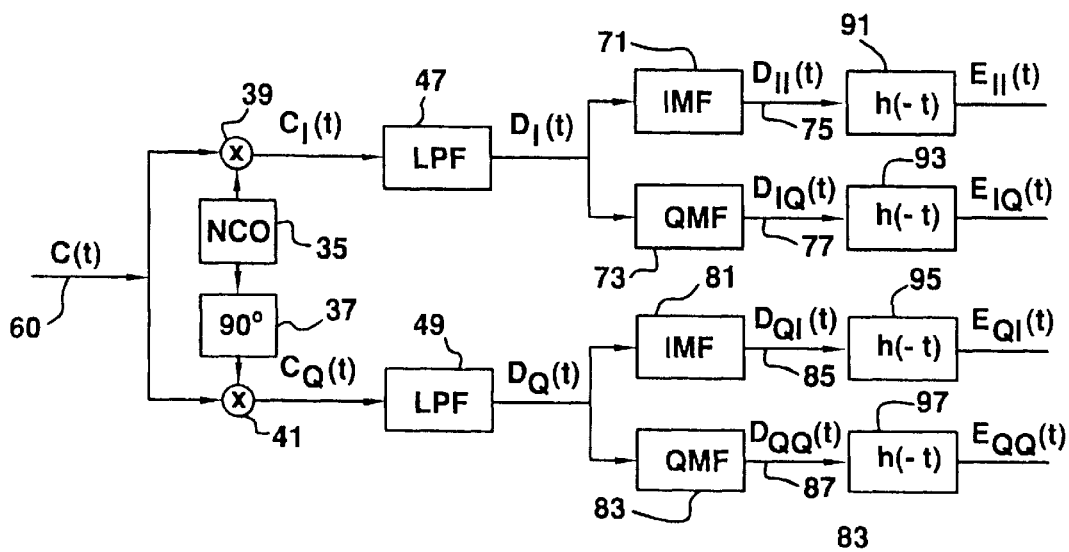
FIG. 5 is a schematic representation of a SAMA QAM demodulator and packet detector.

To detect a packet the b(t) signals are each passed through a filter matched to a known synchronization pulse sequence. The continuous version of that filter has impulse response function h(-t). The outputs of those filters are defined as E(t), and c(t) is defined as the component of the outputs of those filters corresponding to b(t). The SAMA QAM demodulator and the matched filters which provide the packet detection capabilities are shown in FIG. 5. Then, the following correspond to equations (12) to (15):

$$E_{II}(t) = c_{1I}(t)\cos(\delta_1) + n_1(t) \quad (16)$$

$$E_{IQ}(t) = c_{1Q}(t)\sin(\delta_1) + n_2(t) \quad (17)$$

$$E_{QI}(t) = -c_{1I}(t)\sin(\delta_1) + n_3(t) \quad (18)$$

$$E_{QQ}(t) = c_{1Q}(t)\cos(\delta_1) + n_4(t) \quad (19)$$

Since the packet synchronization sequence is known, those signals are squared to obtain:

$$E^2(t) = E_{II}(t)^2 + E_{IQ}(t)^2 + E_{QI}(t)^2 + E_{QQ}(t)^2 = c_{1I}(t)^2 + c_{1Q}(t)^2 + N \quad (20)$$

and since the same packet synchronization sequence is used as a prefix on both the I and the Q channels, packet detection is accomplished with a threshold on $E^2$. Once the start time, $T_S$, of a packet is determined by the threshold on $E^2$ it is possible to use that information together with equations (16) to (19) in several ways to estimate either $\delta_1$ or $\sin(\delta_1)$ or $\cos(\delta_1)$.

In the present disclosure one method of estimating the sine and cosine of the phase offset is specified. It should be understood that any other reasonable estimate of those quantities may also be used.

The peak value of the $c^{**}(t)$ occurs at the start time of a packet and is given by:

$$c^{**}(T_S)=hr \qquad (21)$$

where h is the length of the packet synch sequence and r is the spreading gain. Estimates of $\sin(\delta_1)$ and $\cos(\delta_1)$ may be defined as $$\text{Est}[\sin(\delta_1)] = \hat{S} = K\frac{E_{IQ} - E_{QI}}{hr} \qquad (22)$$

$$\text{Est}[\cos(\delta_1)] = \hat{C} = K\frac{E_{II} + E_{QQ}}{hr} \qquad (23)$$

where K is a positive normalization constant to ensure that the sum of the squares of the two estimates given above is equal to one.

$$K^2 = \frac{(hr)^2}{E^2 + 2E_{II}E_{QQ} - 2E_{IQ}E_{QI}} \qquad (24)$$

so that the estimates used may be written as $$\hat{S} = \frac{E_{IQ} - E_{QI}}{\sqrt{E^2 + 2E_{II}E_{QQ} - 2E_{IQ}E_{QI}}} \qquad (25)$$

$$\hat{C} = \frac{E_{II} + E_{QQ}}{\sqrt{E^2 + 2E_{II}E_{QQ} - 2E_{IQ}E_{QI}}} \qquad (26)$$

where the square root term is positive.

Once the start time of a packet has been determined, the bit values of the bits in the packet are obtained by using equations (25) and (26), as if they were known values, together with equations (12) to (15). Since the bit values are either plus or minus one and the output of the despreading filters are correspondingly either positive or negative, the detection of the bits in the I channel may be formulated as a dual hypothesis test. Using equations (12) and (14), and assuming the noise samples at any given time in the I and the Q channels are independent zero mean Gaussian random variables, the optimum likelihood test for detection of ($\pm 1$) bits in the I channel is given by $\hat{b}_{1I}=1$ if $D_{II}\hat{C}-D_{QI}\hat{S}>0$ $\hat{b}_{1I}=-1$ if $D_{II}\hat{C}-D_{QI}\hat{S}<0$ \qquad (27a)

$\hat{b}_{1I}=1$ if $D_{II}(E_{II}+E_{QQ})-D_{QI}(E_{IQ}-E_{QI})>0$ or $\hat{b}_{1I}=1$ if $D_{II}(E_{II}+E_{QQ})-D_{QI}(E_{IQ}-E_{QI})<0$ \qquad (27b)

while the optimum likelihood ratio test for detection of ($\pm 1$) bits in the Q channel is given by $\hat{b}_{1Q}=1$ if $D_{IQ}\hat{S}+D_{QQ}\hat{C}>0$ $\hat{b}_{1Q}=-1$ if $D_{IQ}\hat{S}+D_{QQ}\hat{C}<0$ \qquad (28a)

$\hat{b}_{1Q}=1$ if $D_{IQ}(E_{IQ}-E_{QI})+D_{QQ}(E_{II}+E_{QQ})>0$ or $\hat{b}_{1Q}=-1$ if $D_{IQ}(E_{IQ}-E_{QI})+D_{QQ}(E_{II}+E_{QQ})<0$ \qquad (28b)

It should be noted that the present disclosure uses the estimated values of the sine and cosine as if they were true values, and it is assumed that the noise in equations (12) to (15) is Gaussian. Both assumptions are reasonable because the signal to noise ratio out of the packet detection filter is much better than that out of the bit detection filter.

In QAM modulator 1 shown in FIG. 1, the first and second bit branches 3 and 5 send bits to an in phase spreader 7 and a quadrature spreader 9 to produce chip signals 11 and 13 related to the bit signals 3 and 5. A numerically controlled oscillator 15 supplies carrier frequency output to a 90° phase shifter 17 and a mixer 19. The phase shifted carrier signal is supplied to mixer 21. The resulting mixed radio frequency signals 23 and 25 are added in an adder 27 and transmitted 29.

As shown in FIG. 2, demodulator 30 in the hub receives the signal 29 and splits it into lines 31 and 33 for demodulation. A numerically controlled oscillator 35 supplies its frequency output to a 900 phase shifter 37 and a multiplier 39. The phase shifted frequency is applied to multiplier 41. The resulting signals 43 and 47 are provided to low pass filters 47 and 49, which results in the spread chip signals 51 and 53. The signals 51 and 53 are provided to in phase matched filter 55 and quadrature matched filter 57 to produce despread signals 56 and 58. In a CDMA system, individual demodulators 30 would be used at the hub to demodulate the unique transmitted signals of each remote transmitter.

In the SAMA demodulator, 60 is shown in FIG. 3. The incoming signal 61, which contains data packets from all transmitters, is split, 62, 63. The signals are multiplied 39 and 41 by the signals from the oscillator 35 and phase shifter 37. The resultant signals 65 and 67 are provided to the low pass filters 47 and 49. The resultant signals 68 and 69 have the in phase and quadrature components of the outputs from many transmitters. Different spreading codes have been used in the quadrature and in phase branches of the transmitters. The SAMA demodulator 60 uses in phase matched filters and quadrature matched filters 71, 73, 81 and 83 for both signals 68 and 69, and produces separate signals 75, 77, 85 and 87, as previously described.

FIG. 4 shows the input and output signals of the in phase matched filters 71 and 81 and the quadrature matched filters 73 and 83, as shown in FIG. 3.

To aid in separating the signals from the individual transmitters, the signals 75, 77, 85 and 87 are provided to synchronization pulse sequence detectors 91, 93, 95 and 97. The synchronization sequence detectors are filters matched to a known identical synchronization pulse at the start of each data packet. The sharp signals from detectors 91–97 are used with the matched filter output signals to make bit decisions and separate data packets from the individual transmitters.

While the invention has been described with reference to specific embodiments, modifications and variations of the invention may be constructed without departing from the scope of the invention, which is defined in the following claims.

I claim:

1. Demodulator apparatus for processing in a hub receiver digital signals from identical plural transmitters, each of which uses the same pair of spreading codes, the demodulator apparatus comprising a receiver having an input for receiving spread spectrum data packet signals, each signal having the same first and the same second spreading sequences from the identical plural transmitters, and first and second mixers connected to the input, an oscillator connected to the first mixer, and a phase shifter connected to the oscillator and to the second mixer for mixing an oscillator frequency and a phase shifted oscillator frequency and producing respectively in-phase chip signals and quadrature chip signals, first and second low pass filters respectively connected to the first and second mixers for respectively producing in phase filtered chip signals and quadrature filtered chip signals, and a first despreader connected to the first low pass filter, and a second despreader connected to the second low pass filter, for respectively despreading the in phase and quadrature chip signals of identical multiple transmitters and producing despread in phase and quadrature chip signals.

2. The apparatus of claim 1, wherein the first despreader further comprises an in phase matched filter and a quadrature matched filter, both connected to the first low pass filter, for respectively providing a first in phase despread chip signal and a first quadrature despread chip signal with two distinct spread sequences, and wherein the second despreader comprises a second in phase matched filter and a second quadrature matched filter, both connected to the second low pass filter for respectively providing a second in phase despread chip signal and a second quadrature despread chip signal.

3. The apparatus of claim 2, further comprising synchronization matched filters connected to the in phase and quadrature matched filters in the first and second despreaders.

4. The apparatus of claim 3, wherein the synchronization matched filters further comprise first, second, third and fourth synchronization matched filters respectively connected to the in phase and quadrature matched filters for forming four outputs of the synchronization matched filters for providing packet onset and phase angle detection.

5. The apparatus of claim 1, further comprising plural transmitters, each having first and second branches of bits, an in phase single code spreader connected to the first branch for creating a sequence of chips for each bit from the first branch, a quadrature distinct single code spreader connected to the second branch for creating a second signal of a sequence of chips for each bit from the second branch, a first multiplier connected to the in phase spreader and a second multiplier connected to the quadrature spreader, an oscillator and a phase shifter connected severally to the first and second multipliers for multiplying chip signals with cosine and sine of a carrier frequency from the oscillator, respectively, and an adder connected to the first and second multipliers for outputting a signal of in phase and quadrature sequences of chips with carrier frequency.

6. Data packet start and phase angle detection apparatus in a single SAMA (Spread Aloha Multiple Access) receiver for separating individual data packets from multiple overlapping data packets received from different multiple identical transmitters, each employing a same pair of spreading sequences, comprising start detectors for detecting starts and phase angles of individual data packets within multiple overlapping data packets having the same pair of spreading codes, estimators for estimating carrier phase offset of the data packets and bit detectors using the start time and phase estimates for detection of bits in the data packets.

7. The method of transmitting to a hub data packets from identical plural remote transmitters comprising using a single pair of identical spreading codes in the identical plural transmitters, supplying bits in each transmitter to inphase and quadrature channels and to inphase and quadrature spreaders respectively in the channels, producing spread chip signals in the inphase and quadrature channels, mixing the inphase spread chip signals in the inphase channel with a frequency from an oscillator, phase shifting the frequency from the oscillator and mixing the spread chip signals in the quadrature channel with the phase shifted frequency, and adding and transmitting the added signals.

8. The method of claim 7, further comprising demodulating the transmitted signals by splitting the signals into two branches, mixing the signals in one branch with a second oscillator frequency and mixing the signals in the other branch with a phase shifted second oscillator frequency, removing the oscillator frequencies from the signals with low pass filters in the branches and producing in both branches spread sequence chip signals with both sequences and with oscillator phase offset relations, despreading the signals in each branch with in phase and quadrature matched filters with two distinct spreading codes, producing despread chip signals with phase relationship, and detecting packet synchronization sequences in the despread chip signals.

9. Separating at a hub data packets from identical plural transmitters in a network comprising the steps of: creating data packets with synchronization pulse sequences and spreading the packets with one pair of identical spreading codes in multiple transmitters, modulating and transmitting the spread coded data packets, receiving and demodulating the data packets, despreading the data packets, detecting the synchronization pulse sequences, and using the detected synchronization pulse sequences in separating the data packets from different transmitters.

10. The method of claim 9, wherein the modulating and demodulating further comprise modulating the spread coded data packets and a carrier frequency and demodulating received packets with the frequency, and producing spread coded packets with phase relationships before despreading the data packets.

11. The method of claim 10, further comprising filtering the demodulated received packets by low pass filtering.

12. The method of claim 11, further comprising despreading the filtered packets by despreading matched filtering.

13. The method of claim 12, further comprising passing the despread data packets through a filter matched to a known synchronization pulse sequence for detecting the synchronization pulse sequences.

14. The method of claim 9, wherein the modulating further comprises modulating data packets in multiple transmitters using the same pair of different spreading codes for quadrature and in phase channels of the transmitters.

15. The method of claim 14, further comprising transmitting data packets from a number of multiple transmitters using a small number of pairs of spreading codes for the quadrature and in phase channels of the transmitters, where the spreading codes are used with more than one user in a class.

16. The method of claim 14, further comprising splitting the received modulated spread coded data packets into branches, and wherein the demodulating further comprises demodulating the received signals in the branches with in phase and quadrature frequency before low pass filtering and despreading the data packets.

17. The method of claim 16, wherein the despreading further comprises conducting the demodulated low pass filtered data packets in the in phase demodulated branch to first in phase and quadrature matched filter despreaders and conducting the demodulated low pass filtered data packets in the quadrature demodulated branch to second in phase and quadrature matched filter despreaders, and providing four despread data packets with phase relationships to synchronization pulse sequence matched filters for detecting start of the data packets.

* * * * *